(12) United States Patent
Frattini et al.

(10) Patent No.: US 10,773,253 B2
(45) Date of Patent: Sep. 15, 2020

(54) LIGANDS FOR REMOVAL OF LIQUID PHASE CATIONS AND METHODS FOR SAME

(71) Applicants: Paul L. Frattini, Los Altos, CA (US); Leon Yengoyan, San Jose, CA (US)

(72) Inventors: Paul L. Frattini, Los Altos, CA (US); Leon Yengoyan, San Jose, CA (US)

(73) Assignee: San Jose State University Research Foundation, San Jose, CA (US)

( * ) Notice: Subject to any disclaimer, the term of this patent is extended or adjusted under 35 U.S.C. 154(b) by 76 days.

(21) Appl. No.: 16/043,094

(22) Filed: Jul. 23, 2018

(65) Prior Publication Data

US 2020/0023347 A1 Jan. 23, 2020

(51) Int. Cl.
| | |
|---|---|
| *B01J 39/20* | (2006.01) |
| *C08F 212/36* | (2006.01) |
| *C08F 212/08* | (2006.01) |
| *C02F 1/42* | (2006.01) |
| *C08F 8/34* | (2006.01) |

(52) U.S. Cl.
CPC ............. *B01J 39/20* (2013.01); *C02F 1/42* (2013.01); *C08F 8/34* (2013.01); *C08F 212/08* (2013.01); *C08F 212/36* (2013.01); *C02F 2001/425* (2013.01); *C08F 2810/40* (2013.01)

(58) Field of Classification Search
CPC ....... B01J 39/20; C08F 212/36; C08F 212/08; C08F 8/34; C08F 2810/40; C02F 1/42; C02F 2001/425
USPC ........................................................ 521/37
See application file for complete search history.

(56) References Cited

U.S. PATENT DOCUMENTS

| | | | |
|---|---|---|---|
| 5,212,207 A | 5/1993 | Sato | |
| 8,975,340 B2 * | 3/2015 | Yengoyan | ............... B01J 39/04 525/328.5 |
| 9,139,456 B2 | 9/2015 | Yokel | |
| 9,214,248 B2 * | 12/2015 | Frattini | .................... G21F 9/12 |
| 2012/0157556 A1 | 6/2012 | Yengoyan | |
| 2016/0002067 A1 * | 1/2016 | Spilling | ............... B01J 20/3248 210/688 |
| 2016/0118153 A1 | 4/2016 | Frattini et al. | |
| 2016/0318773 A1 * | 11/2016 | Wells | ..................... C02F 1/285 |

FOREIGN PATENT DOCUMENTS

DE  2 051 888  4/1972

OTHER PUBLICATIONS tfAETZEL, Synthesis and cyclization of functionalized polyolefinic allyl alcohols with various 1,4 erminator groups, Report (1980), Order No. PB82-116088, Gov. Rep. Announce. Index (U.S.) 1982, 82(2), 272, Registry date: Nov. 16, 1984. (Year: 1984).*
International Search Report and Written Opinion of the International Searching Authority, PCT Application No. PCT/IB2019/000654, dated Dec. 27, 2019.
Maetzel, Synthesis and cyclization of functionalized polyolefinic allyl alcohols with various 1, 4 terminator groups, Report (1980), Order No. PB82-116088, Gov. Rep. Announce. Index (U.S.) 1982, 82(2), 272, Registry date: Nov. 16, 1984.
Pubchem, Substance Record for SID 374611872, Jun. 23, 2018.

* cited by examiner

*Primary Examiner* — Michael Bernshteyn
(74) *Attorney, Agent, or Firm* — Owners Law Firm, PC (57) ABSTRACT

The invention provides chemical compounds for binding to a liquid phase cation having the formula $R_1$—$SO_2$—S—$R_2$—SH, wherein $R_1$ comprises a support molecule, such as a polymer, and $R_2$ comprises an alkyl. The polymer may be a crosslinked, polystyrene divinylbenzene copolymer having a plurality of pendant benzyl groups to which the —$SO_2$—S—$R_2$—SH ligand is attached. The alkyl group may be ethyl or propyl. The chemical compound may be used to complex cation lead or mercury, in which the cation is complexed with mercapto-sulfur of the thio-sulfonyl moiety and the terminal mercaptan to form a heterocyclic ring-like geometry incorporating the cation. A method for removing cations from a liquid stream using the chemical compounds of the present invention is also provided.

19 Claims, 2 Drawing Sheets

LIGANDS FOR REMOVAL OF LIQUID PHASE CATIONS AND METHODS FOR SAME

BACKGROUND OF THE INVENTION

Field of the Invention

The present invention is directed to certain ligands for use in removing certain cations from a liquid. In particular the present invention is directed to a thio-alkyl-sulfonyl-mercaptan ligand attached to the pendant benzyl rings of a polymer, such as crosslinked polystyrene divinylbenzene, that complexes with a liquid phase cation, such as lead, to remove a liquid phase cation from the liquid, such as an industrial liquid stream.

Description of Related Art

Removal of certain liquid phase cations from certain industrial liquid streams can be advantageous. Certain cations found in industrial wastewater streams may be environmental pollutants or deleterious to the industrial process, necessitating their removal from the corresponding liquid stream. For example, certain cations in wastewater and other liquid process streams associated with power generation processes, such as fossil and nuclear process coolants and service cooling water, may need to be removed.

For example, lead is believed to be involved in intergranular attack and stress corrosion cracking of steam generator tubes in nuclear power plants. Lead, which is highly soluble, is ubiquitous in the nuclear plant environment, with sources from welding, soldering, lubrication, the extensive use of lead material for radiation shielding, leading to lead contamination in steam generator feedwater. Lead is known to accelerate stress corrosion cracking of several different alloys (e.g., Alloy 600, 800, and 690) used in steam generator tubes. Moreover, nuclear utilities are pursuing life extension up to 80 years, and new PWR advanced light water reactor designs under construction will use steam generators tubes with 690TT (thermally treated) and 800NG (nuclear grade). In caustic solution, lead causes 690TT and 800NG tubes to actually be more susceptible to stress corrosion cracking than 600MA (mill annealed) tubes, which suffered from severe stress corrosion cracking degradation. Given the significant costs to address these detrimental effects of lead, reducing the amount of lead that comes in contact with steam generator tubes could reduce the risk of lead stress corrosion cracking.

Ion exchange is one method used for removal of cations from liquid streams. For example, ion exchange is used for aqueous cleanup of cationic lead ($Pb^{2+}$) from water streams typical of fossil and nuclear process coolants or service cooling water. However, it is difficult if not impossible to achieve removal that reduces the concentration of the cation in the liquid stream to ultra-low levels (e.g., part per billion or below). In some instances, removal using ion exchange medium is limited due to equilibrium leakage (i.e., the reverse of the uptake reaction). However, removal of cations to such ultra-low levels is necessary to meet technical specifications or discharge regulations. In addition, it should be appreciated that current US environmental protection regulations for lead limits in drinking water are extremely low for example, as low as 10 ppb.

However, achieving such removals of lead is difficult with typical adsorption medium. Even if ionic interactions predominate as with ion exchange, as the medium adsorbs analyte from the influent liquid stream, the analyte concentrates within the pores of the adsorption medium. As a result, the concentration gradient favorable to analyte transport reverses and begins driving the analyte back into the low concentration influent stream. This process is often termed "equilibrium leakage" from the uptake medium, and in the instance of ion exchange beds, it occurs near the outflow end of the bed. Accordingly, the lower the stream concentration desired, the more difficult achieving analyte uptake becomes.

Therefore, it would be advantageous to provide a chemical compound that would provide a high uptake capacity for a given liquid phase cation and that could be used in a process to remove certain cations from a given liquid, thereby reducing the liquid phase concentration of that cation to an ultra-low level. Specifically, it would be beneficial to provide such a chemical compound and process to remove cationic lead from a liquid or liquid stream and reduce the concentration of the lead in the liquid stream to ultra-low levels and to minimize or eliminate any equilibrium leakage. For example, it would be beneficial to provide such a chemical compound and process to remove cationic lead from a liquid stream in a fossil or nuclear power plant and reduce the concentration of the lead in that liquid stream to-ppb levels or below and to minimize or eliminate any equilibrium leakage.

BRIEF SUMMARY OF THE INVENTION

In general, the present invention is directed to chemical compounds for use in removing certain cationic species from a liquid or liquid stream. In particular, the present invention directed to chemical compounds for use in removing certain large cationic species, such as divalent lead ($Pb^{2+}$) or mercury ($Hg^{2+}$), from a liquid or liquid stream. The chemical compounds include certain ligands attached to a support molecule, such as a polymer, that can be used as a medium, such as an ion exchange resin, for removal of certain liquid phase cations from a liquid or liquid stream, such as large cationic species including divalent lead ($Pb^{2+}$) or mercury ($Hg^{2+}$). The ligand is a thiosulfonyl-thiol ($—SO_2—S—R_2—SH$) ligand, also known as a thio-alkyl-sulfonyl-mercaptan ligand. Accordingly, the general formula for the polymer and ligand structure is $R_1—SO_2—S—R_2—SH$, where $R_1$ is a support molecule, such as a polymer, to which the ligand ($—SO_2—S—R_2—SH$) is attached, where $R_2$ is an alkyl group, such as either ethyl or propyl. In one embodiment, the ligand is attached to a polymer such as polystyrene divinylbenzene. In this case, the ligand is attached to a pendant benzyl group in the polystyrene divinylbenzene polymer to which the sulfonyl (i.e., $—SO_2—$) functionality attaches. In use, a given liquid or liquid stream containing certain cationic species, such as lead ($Pb^{2+}$) or mercury ($Hg^{2+}$), is brought into contact with the polymer having the attached ligand. The cationic species complexes or ionically interacts with the attached ligand, thereby removing the cationic species from the liquid or liquid stream and reducing the concentration of that cationic species in the liquid or liquid stream.

In one embodiment, the ligand provides the ability to complex with the cation of interest through a bis-sulfur interaction with the ligand in which the cation complexes or ionically interacts with the mercapto-sulfur of the thiosulfonyl moiety and the terminal mercaptan moiety (—SH), which essentially backbites the cation forming five or six member open rings or ring-like geometries, depending upon whether the $R_2$ alkyl group is ethyl or propyl, respectively.

Without being limited by theory, it is believed that this complexation of the cation through the mercapto-sulfur of the thio-sulfonyl moiety and the backbiting terminal mercaptan moiety provides the ability to remove significant amounts of the cation from a given liquid, resulting in the ability to achieve extremely low concentrations of the liquid with minimal to no equilibrium leakage. For example, the present invention has shown the ability to reduce the concentration of lead ($Pb^{2+}$) in a given liquid to below the part per billion levels with extreme stability.

Accordingly, this ability to reduce the concentration of large cations in a given liquid solution or stream may have several beneficial effects. For example, the present invention and use of the chemical compounds in reducing cationic species has wide application in many industrial applications. For example, reducing the concentration of lead ($Pb^{2+}$) in a given liquid stream can reduce stress corrosion cracking in certain materials in which the liquid stream comes in contact. In addition, removal of certain cation species such as cationic lead and mercury may provide health and environmental benefits. Given that drinking water limits for lead may be as low as 10 ppb, the present invention provides the ability to remove lead in a given liquid stream to such an acceptable levels.

DETAILED DESCRIPTION OF THE
INVENTION

The present invention is more fully described below with reference to the accompanying drawings. While the present invention will be described in conjunction with particular embodiments, such should be viewed as examples and should not be viewed as limiting or as setting forth the only embodiments of the invention. Rather, the present invention includes various embodiments or forms and various related aspects or features and uses, as well as alternatives, modifications, and equivalents within the spirit and scope of the invention and the claims. Further, the use of the terms "invention," "present invention," "embodiment," and similar terms throughout this description are used broadly and are not intended to mean that the invention requires, or is limited to, any particular embodiment or aspect being described or that such description is the only manner in which the invention may be made or used. It should be appreciated that the accompanying drawings are not drawn to scale and are not intended to represent any specific three-dimensional conformation of the chemical compounds or complexes shown.

In general, the present invention is directed to chemical compounds for use in removing certain cationic species from a liquid or liquid stream. In particular, the present invention directed to chemical compounds for use in removing certain large cationic species, such as divalent lead ($Pb^{2+}$) from a liquid or liquid stream. The chemical compounds include certain ligands attached to a support molecule, such as a polymer, that can be used as a medium, such as an ion exchange resin, for removal of certain liquid phase cations from a liquid or liquid stream, such as large cationic species including divalent lead ($Pb^{2+}$).

The ligand is a thiosulfonyl-thiol (—$SO_2$—S—$R_2$—SH) ligand, also known as a thio-alkyl-sulfonyl-mercaptan ligand. Accordingly, the general formula for the polymer and ligand structure is $R_1$—$SO_2$—S—$R_2$—SH, where $R_1$ is a support molecule, such as a polymer, to which the ligand (—$SO_2$—S—$R_2$—SH) is attached, where $R_2$ is an alkyl group that is either ethyl or propyl. In one embodiment, the ligand is attached to a polymer such as polystyrene divinylbenzene. In this case, the ligand is attached to a pendant benzyl group in the polystyrene divinylbenzene polymer to which the sulfonyl (i.e., —$SO_2$—) functionality attaches. In use, a given liquid or liquid stream containing certain cationic species, such as lead ($Pb^{2+}$), is brought into contact with the polymer having the attached ligand. The cationic species binds to the attached ligand, thereby removing the cationic species from the liquid or liquid stream and reducing the concentration of that cationic species in the liquid or liquid stream.

It should be appreciated that an important aspect of the ligand of the present invention is the synthesis of the —$SO_2$—S— bond, i.e., the S—S bonding between the thio-alkyl and the sulfonyl moieties. This provides a ligand having a mercapto-sulfur of the thio-sulfonyl moiety and a terminal mercaptan moiety (—SH). As described below, the lead cation is complexed through a bis-sulfur interaction with the ligand in which the lead cation ($Pb^{2+}$) complexes with the mercapto-sulfur of the thio-sulfonyl moiety and to the terminal mercaptan moiety (—SH), which essentially "backbites" the lead cation ($Pb^{2+}$) thereby forming five or six member open rings or ring-like geometries, depending upon whether the $R_2$ alkyl group is ethyl or propyl, respectively. The complexation of the cation with the ligand may also be referred to as an ionic interaction or chemisorption, which occurs through the positive charge on the cation and the electronegativity of the mercapto-sulfur of the thio-sulfonyl moiety and a terminal mercaptan moiety. Accordingly, it should be appreciated that cations other than lead may be complexed using the ligand of the present invention. For example, cations that are similar to lead ($Pb^{2+}$), such as cationic mercury, may be complexed in a similar fashion and essentially removed from a given liquid stream or solution. Without being limited by theory, it is believed that this complexation of the cation by the ligand of the present invention through the mercapto-sulfur of the thio-sulfonyl moiety and the backbiting terminal mercaptan moiety provides the ability to remove significant amounts of the cation from a given liquid, resulting in the ability to achieve extremely low concentrations of the given cation within the liquid.

Figure 1:
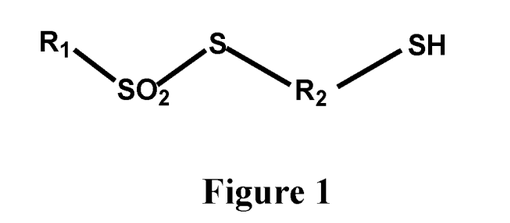
FIG. 1 illustrates a generic chemical compound for use in removing a cation from a liquid according to one embodiment of the invention.

FIG. 1 illustrates a generic chemical compound for use in removing a cation from a liquid according to one embodiment of the invention. As shown, the chemical compound has the formula of $R_1$—$SO_2$—S—$R_2$—SH, where $R_1$ is a support molecule to which the ligand (—$SO_2$—S—$R_2$—SH, where $R_2$ is an alkyl group) of the present invention is attached. The ligand is a thiosulfonyl-thiol (—$SO_2$—S—

$R_2$—SH) ligand, also known as a thio-alkyl-sulfonyl-mercaptan ligand, where $R_2$ is an alkyl group, which in some embodiments is either propyl or ethyl. In one embodiment, the support molecule $R_1$ is a polymer and may be any polymer to which the ligand can be attached; in practice, it is usually a neutral, carbon and hydrogen containing chain that can support the sulfonyl group of the ligand being attached. In some embodiments, a benzyl group can be used as the point at which the sulfonyl group of the ligand is attached. In other words, the polymer may have available pendant benzyl groups to which the ligand is attached through the sulfonyl (i.e., —SO$_2$—) functionality of the ligand. In one embodiment, the polymer is polystyrene divinylbenzene. It should be appreciated, however, that the support molecule may be any chemical compound to which the ligand can be attached. In some embodiments, the support molecule can be any chemical compound having pendant benzyl groups to which the ligand can be attached through the sulfonyl functionality of the ligand. It should be appreciated that the support molecule should be able to withstand the conditions used for synthesizing/attaching the ligand of the present invention to the available pendant groups.

It should be appreciated that in some embodiments the sulfonyl group attached to the polymer is such that the thioalkyl group can be attached to the sulfonyl group on the polymer through nucleophilic attack. Therefore, a support molecule, such as a polymer, with any pendant group to which the sulfonyl group is attached, and that itself can be attacked nucleophilically, can be used to support the ligand of the present invention. In addition, the resulting structure of the support molecule, such as a polymer, with the attached ligand must be stable enough to maintain the capability of backbiting geometry for complexing large divalent cations such as lead ($Pb^{2+}$).

Figure 2:
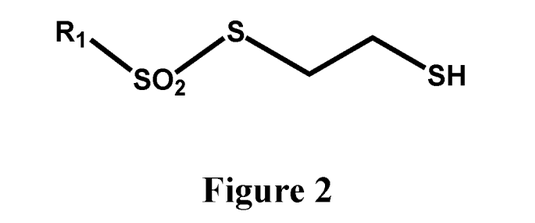
FIG. 2 illustrates one chemical compound for use in removing a cation from a liquid according to one embodiment of the invention.

FIG. 2 illustrates one chemical compound for use in removing a cation from a liquid according to one embodiment of the invention. As shown, in this embodiment, the compound has the structure of the compound of FIG. 1, wherein the alkyl group ($R_2$) is ethyl.

Figure 3:
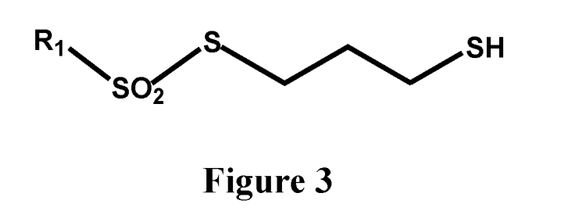
FIG. 3 illustrates another chemical compound for use in removing a cation from a liquid according to another embodiment of the invention.

FIG. 3 illustrates another chemical compound for use in removing a cation from a liquid according to another embodiment of the invention. As shown, in this embodiment, the compound has the structure of the compound of FIG. 1, wherein the alkyl group ($R_2$) is propyl.

The chemical compounds of the present invention can be synthesized by starting with a support molecule, such as a polymer network resin pre-functionalized with a sulfonic acid feature (e.g., polystyrene sulfonyl chloride, which is commonly available). Alternatively, the polymer network resin with a sulfonic acid feature can be synthesized by starting with a crosslinked polystyrene divinylbenzene copolymer with multiple available pendant benzyl rings (also commonly available), and synthesizing the sulfonic acid moiety on the polymer by reacting with thionyl chloride to form a sulfonyl chloride or by reacting with excess chlorosulfonic acid. It should be appreciated that the degree to which the polystyrene is crosslinked with divinylbenzene affects the amount of available pendant benzyl rings for attachment of the sulfonic acid moiety. Accordingly, in some embodiments, a weakly or mildly crosslinked polystyrene divinylbenzene copolymer can be used. In some embodiments, the degree or amount of crosslinked divinylbenzene is less than 10%. In some embodiments it is less than 8%, and in some embodiments it is 6-10%. It should also be appreciated that in some cases, using both thionyl chloride and chlorosulfonic acid during addition of the sulfonic acid moiety results in the addition of inorganic chloride to the polymer. In some embodiments, better yield can be obtained by using thionyl chloride in a post-synthesis or subsequent cold wash. It should also be appreciated that storage of the chlorosulfonated polymer, such as in the form of beads, may result in hydrolysis of the sulfonyl chloride groups to sulfonic acid groups. However, subsequent treatment with thionyl chloride can convert sulfonic acid to sulfonyl chloride to provide full chlorosulfonation of each pendant benzyl ring.

Once the polymer sulfonyl chloride has been generated, a ligand precursor terminated on both ends with a mercaptan is reacted with the polymer sulfonyl chloride in an appropriate basic buffer system. One end of the ligand precursor attaches to the sulfonic acid function of the polymer through a thio-sulfonyl bond. In this way, the ligand can be attached to each identifiable sulfonyl group on the polymer through a thionyl chloride intermediate chemistry in base to produce the overall compound structure of $R_1$—SO$_2$—S—$R_2$—SH, where $R_1$ is a polymer to which the ligand (—SO$_2$—S—$R_2$—SH) is attached, where $R_2$ is an alkyl group that may be either propyl or ethyl. It is important that the basic feature of the buffer does not attack the thionyl chloride independently of the thio-mercaptan. In some embodiments, the basic solution in which the ligand precursor is attached to the sulfonic acid moiety of the polymer contains sodium hydroxide and may have a pH of approximately 10-11.

To form the chemical compound wherein the alkyl group ($R_2$) is ethyl (see FIG. 2), in one embodiment, the polymer sulfonyl chloride, which may be in the form of polystyrene divinylbenzene (PS-DVB) beads is reacted with 1,2-dimercaptoethane as follows:

[PS-DVB]-SO$_2$—Cl+HS—[CH$_2$]$_2$—SH+NaOH (aq)→[PS-DVB]-SO$_2$—S—[CH$_2$]$_2$—SH+NaCl (aq)+H$_2$O     (1)

Specifically, a homogeneous solution of 1,2-dimercaptoethane, sodium hydroxide, and dimethoxyethane (monoglyme, an ether-like solvent) is made. The reaction pH should be approximately 10-11. The reaction must be sufficiently basic such that the 1,2-dimercaptoethane can exist as an anion to condense with the sulfonyl chloride group of the polymer. If the base is too strong, sulfonyl chloride hydrolysis may occur preventing the reaction with the 1,2-dimercaptoethane. If the base is too weak, such may also prevent the reaction with the 1,2-dimercaptoethane.

The polymer sulfonyl chloride, such as [PS-DVB]-SO$_2$—Cl, in the form of small beads is then added to the above homogeneous solution. Since the polymer substrate is in the form of small beads, these beads are slowly added drop-wise into the solvated dimercaptoalkane solution while the reaction vessel containing the solution is held on ice, as the reaction is exothermic. In some embodiments, the temperature is maintained at approximately 0-4° C. Various washings may then be used, such as washing with water, methanol, and ethyl acetate. Thereafter, the beads may be dried and are ready for use. Additional details regarding the synthesis of the chemical compounds of the present invention are provided in the Examples.

To form the chemical compound wherein the alkyl group ($R_2$) is propyl (see FIG. 3), in one embodiment, the polymer sulfonyl chloride, which may be in the form of polystyrene divinylbenzene (PS-DVB) beads, is reacted with 1,3-dimercaptopropane as follows:

[PS-DVB]-SO$_2$—Cl+HS—[CH$_2$]$_3$—SH+NaOH (aq)→[PS-DVB]-SO$_2$—S—[CH$_2$]$_3$—SH+NaCl (aq)+H$_2$O     (2)

Specifically, a homogeneous solution of 1,3-dimercaptopropane, sodium hydroxide, and dimethoxyethane (monoglyme, an ether-like solvent) is made. The reaction pH should be approximately 10-11. The reaction must be sufficiently basic such that the 1,3-dimercaptopropane can exist as an anion to condense with the sulfonyl chloride group of the polymer. If the base is too strong, sulfonyl chloride hydrolysis may occur preventing the reaction with the 1,3-dimercaptopropane. If the base is too weak, such may also prevent the reaction with the 1,3-dimercaptopropane.

The polymer sulfonyl chloride, such as [PS-DVB]-$SO_2$—Cl, in the form of small beads is then added to the above homogeneous solution. Since the polymer substrate is in the form of small beads, these beads are slowly added drop-wise into the solvated dimercaptoalkane solution while the reaction vessel containing the solution is held on ice, as the reaction is exothermic. In some embodiments, the temperature is maintained at approximately 0-4° C. Various washings may then be used, such as washing with water, methanol, and ethyl acetate. Thereafter, the beads may be dried and are ready for use. Additional details regarding the synthesis of the chemical compounds of the present invention are provided in the Examples.

In use, the chemical compounds of the present invention, specifically the polymer with the attached ligand, may be in the form of a medium that is contacted with a given liquid or liquid stream containing a cation to be removed, such as a large cation, including, for example, lead ($Pb^{2+}$) or mercury ($Hg^{2+}$). In some embodiments, the medium may be in the form or a resin or resin beads, particularly in the embodiment in which a ligand of the present invention is attached to a polymer, that are held, for example, in a bed through which a given liquid or liquid stream is passed. Other physical forms of the medium known in the art could be used in conjunction with known means of contacting a liquid and such medium for removal of a given species, in this case, a cation.

During contact between the chemical compounds of the present invention and the liquid containing the cation to be removed, the cation is complexed or ionically interacts with the ligand of the present invention. As described above, the cation is complexed through a bis-sulfur interaction with the ligand in which the cation complexes or ionically interacts with the thio sulfonyl moiety, specifically the mercapto-sulfur of the thio-sulfonyl moiety, and the terminal mercaptan moiety (—SH), which essentially backbites the cation to form five or six member open rings or ring-like geometries, depending upon whether the $R_2$ alkyl group is ethyl or propyl, that essentially incorporate the cation as part of the open ring. In this manner the cation is actually complexed from two points on a single ligand by using the two sulfurs that each contribute electronegativity to the positively charged cation. This ionic interaction provides a more stable complex and reduces the ability of the complexed cation to be released back into solution based upon equilibrium leakage.

In one embodiment, the cation that is complexed is lead ($Pb^{2+}$). Accordingly, the ligands of the present invention can be used to bind to cationic lead ($Pb^{2+}$) in the liquid phase to remove the cationic lead from the liquid. In such cases, the ligand is attached to a polymer that is used as a medium in contact with a given liquid or liquid stream containing cationic lead. The sulfhydril attractor is used as the portion of the ligand which takes up lead cations (otherwise known as a terminal mercaptan of the chemical form —SH). The highest binding energy and fastest uptake kinetics have been observed for lead cations when two reduced sulfur moieties are bound to the same lead cation. Moreover, the use of two mercaptans reduces or minimizes the release of bound lead back into solution thereby limiting the effluent removal fraction for a given liquid stream substantially. Accordingly, rather than using two independent mercapto-terminated ligand features to bind to a lead cation, a type of bis-sulfhydril bonding is used, wherein a geometric backbiting, resulting in a five member open ring or ring-like geometry when the ligand has an ethyl alkyl group ($R_2$) or a six member open ring or ring-like geometry when the ligand has a propyl alkyl group ($R_2$). This allows the same ligand to provide both sulfur atoms from which electronegativity is donated to the cationic lead. In some embodiments, the removal of cationic lead exceeds the removal that would otherwise be achieved with ion exchange. It should be appreciated that this same type of bis-sulfhydril bonding can be used to complex mercury cations ($Hg^{2+}$). Accordingly, it should be appreciated that other similar cations may be similarly complexed and removed from a given liquid or liquid stream.

Figure 4:
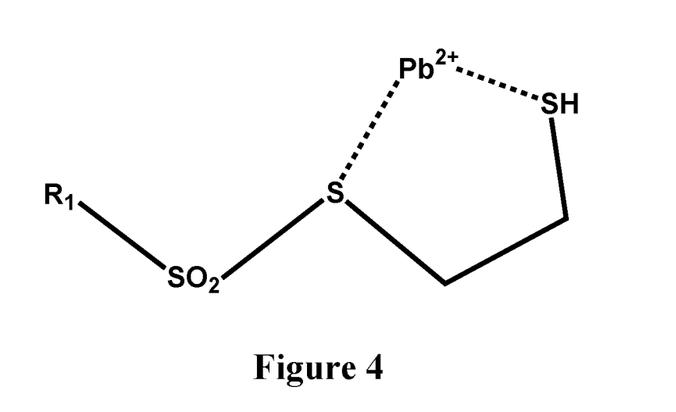
FIG. 4 illustrates the chemical compound of FIG. 2 interacting with cationic lead cation according to one embodiment of the invention.

FIG. 4 illustrates the chemical compound of FIG. 2 interacting with cationic lead cation according to one embodiment of the invention. In this embodiment, the chemical compound of FIG. 2 is shown, which is $R_1$—$SO_2$—S—$R_2$—SH, where $R_1$ is a polymer, as described above, to which the ligand (—$SO_2$—S—$R_2$—SH) is attached, where $R_2$ is ethyl and where the dashed lines represent the ionic interactions with the lead. (It should be appreciated that FIG. 4 is not intended to illustrate any steric or otherwise proportional/three dimensional aspects of the chemical compound and the binding of the lead.)

As shown, lead is electronegatively complexed to the ligand through two linkages, one with the mercapto-sulfur of the thio-sulfonyl moiety (or the sulfhydril moiety adjacent to the sulfonyl (also termed a thio-sulfonyl bond) that is attached to the polymer) and the terminal mercapto group at the terminal end of the ligand. In other words, the alkyl, in this case the ethyl alkyl, separates the two points to which the lead is complexed along the ligand. Accordingly, the lead once associated with the ligand in this manner, basically forms a geometry like that of a five member open ring consisting of the ligand backbiting onto the cation. Such adsorptive interactions secure the lead cation to the ligand/polymer, which in some embodiments may be in the form of a resin or resin beads, and thereby removes the lead cation from the liquid phase or liquid stream.

Figure 5:
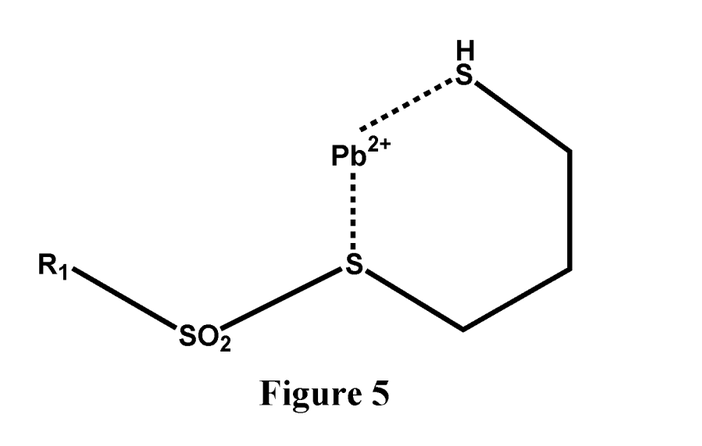
FIG. 5 illustrates the chemical compound of FIG. 3 interacting with cationic lead cation according to one embodiment of the invention.

FIG. 5 illustrates the chemical compound of FIG. 3 interacting with cationic lead according to one embodiment of the invention. The chemical compound of FIG. 3 is shown, which is $R_1$—$SO_2$—S—$R_2$—SH, where $R_1$ is a polymer containing pendant benzyl groups, such as mildly crosslinked, polystyrene divinylbenzene copolymer, to which the ligand (—$SO_2$—S—$R_2$—SH) is attached to the pendant benzyl group, where $R_2$ is propyl and where the dashed lines represent the ionic interactions with the lead. (It should be appreciated that FIG. 5 is not intended to illustrate any steric or otherwise proportional/three dimensional aspects of the chemical compound and the binding of the lead.)

As shown, lead is complexed by the ligand through two linkages, one with the mercapto-sulfur of the thio-sulfonyl moiety (or the sulfhydril moiety adjacent to the sulfonyl (also termed a thio-sulfonyl bond) that is attached to the polymer) and the terminal mercapto group at the terminal end of the ligand. In other words, the alkyl, in this case the propyl alkyl, separates the two points to which the lead is electronegatively complexed along the ligand. Accordingly, once complexed to the ligand in this manner, the lead is basically captured in a geometric six-member open ring consisting of the ligand backbiting onto the cation. Such binding secures the lead to the ligand/polymer, which is some embodiments may be in the form of a resin or resin beads, and thereby removes the lead from the liquid or liquid stream.

In some embodiments, lead can be captured up to 200 mg/gm capacity for the thio propyl sulfonyl mercaptan ligand (i.e., the ligand of FIG. 3). Testing has shown that lead concentrations as high as 50 ppb in water (as lead nitrate) could be reduced to below 0.5 ppb within a matter of minutes exposure time. Therefore, in some embodiments, the concentration of lead in the effluent liquid stream may be below 1 ppb or at an ultra-low level. Further, the pH of the effluent liquid approached that of concentrated nitric acid when the test analyte was lead in nitrate form, which illustrates that the bis-sulfhydril complex or the interaction of the lead to the sulfur adjacent to the sulfonyl (i.e., the mercapto-sulfur of the thio-sulfonyl moiety) is highly stable, as the corresponding low pH of the effluent did not exhibit any deleterious effect on lead removal. Therefore, this reduces or eliminates the possibility of any desorption of the lead from the ligand back into the liquid or liquid stream.

Following are several examples illustrating embodiments for making and using the chemical compounds of the present invention. These examples are not to be deemed limiting in that other methods of synthesizing and using the chemical compounds of the present invention may be used.

Example No. 1

The following illustrates one embodiment for the synthesis of a polymer sulfonyl chloride and analysis of same. Crosslinked polystyrene divinylbenzene copolymer beads (20 gm) were mixed with acetone (150 ml) for two hours, filtered, and vacuum dried at 50° C. for 24 hours. This would remove any low molecular weight styrene oligomers. Next, the polystyrene divinylbenzene copolymer beads (12 gm) were mixed with dry dichloromethane (120 ml) and stirred for one hour at room temperature. This process swells the beads and maximizes chlorosulfonation. Next, chlorosulfonic acid (15 ml, 226 mmoles, but 113 mmoles incorporated) was added dropwise over 15 minutes with stirring at room temperature. The original white bead color of the resin changes to a purple black color. The reaction was stirred for 20 hours at room temperature, and the solvent was decanted. Clean dichloromethane (40 ml) was added, stirred for five minutes, and the solvent was again decanted. This was done a total of three times. The beads were removed of solvent under house vacuum until the beads became "pourable". Now the bead color was dark brown. The beads fume when wet litmus paper is suspended above the beads. Fuming is the release of gaseous hydrogen chloride and sulfur trioxide from the pores. The yield of the crude product was 15.3 gm.

Assuming every aromatic ring of the neutral crosslinked polystyrene resin is mono chlorosulfonated, the molecular weight change (loss of H and the addition of —$SO_2Cl$) is a net molecular weight increase of 98.5 mg per mmole of sulfonyl chloride or a theoretical weight increase of 11.13 gm. The weight after subsequent drying was 13.7 gm. This represents about 100% reaction yield. However, it should be appreciated that not every aromatic ring in the polymer would be chlorosulfonated, as the crosslinked rings would not be chlorosulfonated, which could be on the order of approximately 8%. Therefore, the theoretical molecular weight would actually be lower.

A chloride test was performed on the beads. The chloride test was conducted by suspending the dry beads (10 mg) in DI water (1.0 ml) and stirring/heating at 80° C. for 25 minutes in a sealed ampoule. A second sample (10 mg) was added to water (1.0 ml) and stirred at 0° C. for 25 minutes. Each sample (0.4 ml) was mixed with 0.4 ml of 5% silver nitrate. The turbidity of the resulting silver chloride was measured at 650 nanometer (nm) wavelength. The crude beads by the chloride test was positive for chloride ion (ionic chloride) and sulfonyl chloride (covalent chloride) showing about 5 times more of the latter.

A small variation of the chloride test was also used when there was a high percent of covalent chloride and a low percent of ionic chloride. Here, two samples (40 mg each) were added to water (2.5 ml), one was held at 0° C. with stirring for 30 minutes and the second sample in a sealed ampoule was stirred/heated at 65° C. Each sample was centrifuged, and 2.0 ml was mixed with 2.0 ml of 5% silver nitrate. The turbidity at 650 nm was measured. This showed that sulfonyl chloride has hydrolytic stability in ice water.

At this stage, the beads (25 gm) were mixed in ice water (200 ml), stirred five minutes, and filtered. The filtrate pH should be about 7; if not, the beads were again added to ice water (100 ml), mixed, and filtered until the pH was neutral. Next, the beads were re-suspended in acetone (100 ml) and decanted, which was repeated a second time using ethyl acetate (100 ml). The beads were filtered and air dried under vacuum. Chloride testing showed covalent chloride to ionic chloride to be about 98% to about 2%.

The chlorosulfonated beads were stored under a vacuum until use. However, the beads may have both sulfonyl chloride and some sulfonic acid groups. The latter are formed by hydrolysis of the sulfonyl chloride; however, subsequent post-synthetic treatment with thionyl chloride treatment would convert sulfonic acid to sulfonyl chloride to provide full chlorosulfonation of each pendant benzyl ring. This treatment was performed by suspending the dry chlorosulfonated beads (3 gm) in toluene (25 ml) and heating to 55° C. Thionyl chloride (3.0 ml) was then added over 5 minutes. The reaction solution bubbled indicating reaction between thionyl chloride and sulfonic acid. The bubbling decreased with time. After an hour the reaction was cooled and decanted of solvent and washed twice with dry toluene (25 ml), which was followed by two washings (25 ml) with methylene chloride (25 ml). The sample was dried of solvent leaving light tan-brown colored beads. The sample did not fume, and the chloride test showed chloride ion to be about 1-2%. These beads had about 3.7 mmoles chloride/gm of dry beads.

A base hydrolysis titration was performed, which allows for the determination of total sulfonic acid in the resin. Ideally the total sulfonyl chloride content and sulfonic acid titrated should be nearly the same value. In this procedure dry chlorosulfonated beads (1 gm) were added to 5.0 ml of 3M NaOH, and the mixture was stirred at 65° C. for two hours. The solution was removed, and the beads were washed with water until the pH was neutral. The beads were placed in 3.0M HCl (8.0 ml). The beads are filtered and water washed until the filtrate was pH neutral, which was followed by methanol (20 ml) and ethyl acetate (20 ml) washings and filtration. The beads were heated to 52° C. in a vacuum oven for 48 hours to get complete water removal, as the beads must be free of bound water to give accurate results. The beads were titrated with 0.1000 M NaOH, giving values of 3.60-3.69 mmoles of sulfonic acid/gm beads, which compares well with the 3.7 mmoles chloride/gm of dry beads determined above from the chloride test.

It should be appreciated that the preparation of chlorosulfonated beads in some embodiments should have the following features: no release of acid fumes of the sample when wet litmus is brought near sample; bead color should be light tan as highly colored samples have low gravimetric capacity to metals; covalent chloride should be about 3.6-3.7 mmoles chloride/gm resin; free sulfonic acid groups should be less than 0.03 mmoles $H^+$/gm resin; ionic chloride should be less than 1% of covalent chloride; and the total sulfonic acid after base hydrolysis should be about 3.6-3.7 mmoles $H^+$/gm resin. These are typical results of this type of chlorosulfonic acid reaction with polystyrene divinylbenzene copolymer.

Example No. 2

The following illustrates one embodiment for the synthesis of 3-mercaptopropyl thiolate (i.e., $R_1$—$SO_2$—S—$R_2$—SH, where $R_1$ is a polymer to which the ligand (—$SO_2$—S—$R_2$—SH) is attached and where $R_2$ is propyl). In this case, the polymer used was a chlorosulfonated polymer prepared using polystyrene divinylbenzene copolymer as described above in Example No. 1.

The synthesis of the ligand of the present invention on polystyrene divinylbenzene (i.e., synthesis of thiosulfonyl-thiol (—$SO_2$—S—$R_2$—SH) ligand, also known as a thio-alkyl-sulfonyl-mercaptan ligand, where the alkyl group is propyl), which may be referred to as polystyrene divinylbenzene sulfonyl 3-mercaptopropyl thiolate or "PSMPT," was performed through the addition of 1,3 dimercaptopropane as a mercaptan anion to the polystyrene divinylbenzene sulfonyl chloride polymer in the form of beads as produced in Example No. 1 above to form a thiolate linkage as part of the PSMPT structure. The following reaction amounts were used: 2 gm of the polystyrene divinylbenzene sulfonyl chloride polymer product (7.4 mmoles), 0.82 ml or 0.89 gm 1,3 dimercaptopropane (8.14 mmoles), 8.14 ml of 1M NaOH sodium hydroxide (8.14 mmoles), and 31 ml monoglyme (a known ether containing solvent). A homogeneous solution of the mercaptan, NaOH, and monoglyme was made. The pH of this solution should be about 10 to 11. The reaction must be sufficiently basic such that 1,3 dimercaptopropane can exist as an anion in order to condense with the sulfonyl chloride group of polystyrene divinylbenzene sulfonyl chloride polymer. If the base is too strong, it causes sulfonyl chloride hydrolysis, while a weak base like triethylamine does not produce any product.

The polystyrene divinylbenzene sulfonyl chloride polymer beads were then added to this solution and stirred/heated at 50° C. for 2.5 hours. The pH changed to about 8. The solution was decanted from the beads, water (40 ml) was added, and the solution was stirred and decanted a few times until the solution pH was near neutral. Next, the PSMPT is finished by adding methanol (25 ml) and decanting to remove water from the beads. This was repeated using ethyl acetate (25 ml), which was added to produce a neutral ligand. The beads were then vacuum filtered and dried. The product was a light tan color.

The resulting dry beads were tested for the presence of the mercapto group using Ellmans Reagent, dithionitrobenzene (DTNB), which has an absorbance maxima at 325 nm. The mercapto group (as an anion) of PSMPT attacks the disulfide linkage of DTNB forming a mixed disulfide and a yellow chromophoric compound (2-nitro 5-thiobenzoic acid or TNB), which has an absorbance maxima at 410-412 nm. This absorbance at 410-412 nm is directly proportional to the amount of PSMPT if DTNB is in excess. The data showed that there was a definitive presence of the terminal mercaptan in this PSMPT product.

In addition, lead ion was added to PSMPT, and the beads were washed with DI water until a negative test for $Pb^{2+}$ as obtained. Then the lead-treated PSMPT was mixed with DTNB, a few milligrams at a time. No decease in absorbance at 325 nm or increase in the 410 nm peak was observed. Because lead is known to bind strongly to thiols, this indicates the lead ion bound to PSMPT prevents the mercaptan group from reacting with DTNB.

In theory, Ellmans Reagent can be used to determine the number of mmoles SH groups per gm of bead. One procedure is to compare the absorbance of a sample of PSMPT with a commercial sample of Aldrich 3-mercaptopropyl silica, which has a capacity of 1.2 mmoles SH per gm bead. A 10 mg sample of the Aldrich mercapto silica in 2.5 ml of DTNB/reaction buffer produced an absorbance of 2.79 while 4.0 mg of the synthesized PSMPT in 2.5 ml of DTNB/reaction buffer produced an absorbance of 2.19. These results indicate that the PSMPT had 2.35 mmoles SH groups/gm beads. Although this value is low (compared to the 3.70 mmoles SH groups/gm beads noted above), such is attributed to likely weighing error due to the small sample size and the fact that the sample must be dry.

An alternate approach in comparing absorbance values is to directly measure a single absorbance and relate the measured value to concentration using the molar absorptivity of the liquid solution being measured. The formation of TNB (2-nitro 5-thiobenzoic acid), which has absorbance at 412 nm and a molar absorptivity of 14,150 $M-1$ $cm^{-1}$, can be used. The molar absorptivity value is not affected by pH changes between 7.6-8.6 if the solvent is 0.1 M phosphate at pH of 8 in 1 mM EDTA.

Example No. 3

The following illustrates the metal ion binding capacity of the chemical compounds of the present invention. The capacity of $Pb^{2+}$ binding to PSMPT is based on a gravimetric procedure as follows: A known dry weight of PSMPT is treated with excess $Pb^{2+}$ and washed free of unbound ions. Then the beads are dried to constant weight by nitrogen gas entrainment. The increase in weight is due to the bound ions. This data will give the capacity as milligrams of metal ions bound per gram of beads. In one set of tests, the capacity based on three determinations was PSMPT/$Pb^{2+}$ was on average 406 mg lead/gram beads (using 408, 408, and 403 mg/gm data points). In another set of tests, the capacity based on three determinations was PSMPT/$Hg^{2+}$ was on average 114 mg mercury/gram beads (using 102, 126, and 114 mg/gm data points).

Example No. 4

Another experiment measured the effectiveness of the beads in reducing a 15 ppb concentration of $Pb^{2+}$ and a 10 ppb concentration of $Hg^{2+}$. A solution of 15 ppb $Pb^{2+}$ was prepared by rinsing/decanting a clean, unused plastic centrifuge tube (50 ml) with deionized water of high purity. Lead nitrate was added to provide a solution of 15 ppb $Pb^{2+}$. This standard was prepared following EPA procedures for lead analysis (ICP-MS). The solution of mercury was prepared in the same manner except mercuric chloride salt was added instead of lead nitrate. The mercury standard was prepared following EPA procedures for mercury analysis (cold vapor atomic absorption).

1 gm of PSMPT was added to the lead solution and stirred for 2.5 hours at room temperature and centrifuged. 22 ml of solution was decanted into a clean, unused, washed and dried centrifuge tube (50 ml) for analysis. The sample was found to contain 0.41 ppb $Pb^{2+}$ after resin treatment. The minimum detectable limit (MDL) was 0.031 ppb. Hence, exposure to the polymer adsorbate consisting of the thio sulfonyl propyl mercaptan ligand in solution rapidly reduced 15 ppb lead cations to less than 0.5 ppb simply with stirring/mixing. This result represents a 30:1 uptake efficiency.

The same procedure was used for the mercury standard. The sample was found to contain 0.46 ppb $Hg^{2+}$ after resin treatment. The minimum detectable limit (MDL) was 0.031 ppb. Hence, exposure to the polymer adsorbate consisting of the thio sulfonyl propyl mercaptan ligand in solution rapidly reduced 10 ppb mercury cations to less than 0.5 ppb simply with stirring/mixing. This result represents a 20:1 uptake efficiency.

Various embodiments of the invention have been described above. However, it should be appreciated that alternative embodiments are possible and that the invention is not limited to the specific embodiments described above. For example, while the chemical compounds of the present invention have been described above as using a polystyrene divinylbenzene polymer, other polymers having appropriate pendant moieties to which the ligand of the present invention can be attached, such as pendant benzyl groups, may be used. In addition, other molecules may be used as the support molecule provided they have an appropriate group, such as a pendant benzyl group, to which the ligand can be attached. In addition, while the chemical compounds of the present invention have been described for use in complexing with cationic lead and mercury to remove such species from a given liquid or liquid stream, other similar cations may be similarly complexed and removed from a given liquid or liquid stream.

It should also be appreciated that the chemical compounds of the present invention may be used in various environments or industries in which removal of cationic species is desirable, as the ability to reduce the concentration of large cations in a given liquid solution or stream may have several beneficial effects. For example, reducing the concentration of lead ($Pb^{2+}$) in a given liquid stream can reduce stress corrosion cracking in certain materials in which the liquid stream comes in contact. In addition, removal of certain cation species such as cationic lead and mercury may provide health and environmental benefits. Given that drinking water limits for lead may be as low as 10 ppb, the present invention provides the ability to remove lead in a given liquid stream to such an acceptable levels.

What is claimed is:

1. A chemical compound for binding to a liquid phase cation, comprising:
a chemical compound having the formula $R_1$—$SO_2$—S—$R_2$—SH, wherein $R_1$ comprises a support molecule and $R_2$ comprises an alkyl.

2. The chemical compound of claim 1, wherein said support molecule comprises a polymer and said alkyl comprises ethyl.

3. The chemical compound of claim 2, wherein said polymer comprises a crosslinked, polystyrene divinylbenzene copolymer having a plurality of pendant benzyl groups to which the —$SO_2$—S—$R_2$—SH is attached.

4. The chemical compound of claim 1, wherein said support molecule comprises a polymer and said alkyl comprises propyl.

5. The chemical compound of claim 4, wherein said polymer comprises a crosslinked, polystyrene divinylbenzene copolymer having a plurality of pendant benzyl groups to which the —$SO_2$—S—$R_2$—SH is attached.

6. A chemical compound bound to a liquid phase cation, comprising:
a chemical compound having the formula $R_1SO_2$—S—$R_2$—SH, wherein $R_1$ comprises a support molecule and $R_2$ comprises an alkyl; and
a cation complexed with said chemical compound.

7. The chemical compound of claim 6, wherein said cation is complexed with at least a mercapto-sulfur of a thio-sulfonyl moiety of said chemical compound.

8. The chemical compound of claim 6, wherein said cation is complexed with at least a terminal mercaptan of said chemical compound.

9. The chemical compound of claim 6, wherein said cation is complexed with a mercapto-sulfur of a thio-sulfonyl moiety of said chemical compound and a terminal mercaptan of said chemical compound.

10. The chemical compound of claim 6, wherein said cation is complexed with a mercapto-sulfur of a thio-sulfonyl moiety of said chemical compound and a terminal mercaptan of said chemical compound to form a ring-like geometry.

11. The chemical compound of claim 6, wherein said support molecule comprises a polymer having a plurality of pendant benzyl groups and said cation is cationic lead.

12. The chemical compound of claim 11, wherein said polymer comprises a crosslinked, polystyrene divinylbenzene copolymer, wherein the —$SO_2$—S—$R_2$—SH is attached to at least one of said plurality of pendant benzyl groups, wherein said alkyl comprises ethyl, and wherein said cationic lead is complexed with a mercapto-sulfur of a thio-sulfonyl moiety of said chemical compound and a terminal mercaptan of said chemical compound to form a five member ring-like geometry.

13. The chemical compound of claim 11, wherein said polymer comprises a crosslinked, polystyrene divinylbenzene copolymer, wherein the —$SO_2$—S—$R_2$—SH is attached to at least one of said plurality of pendant benzyl groups, wherein said alkyl comprises propyl, and wherein said cationic lead is complexed with a mercapto-sulfur of a thio-sulfonyl moiety of said chemical compound and a terminal mercaptan of said chemical compound to form a six member ring-like geometry.

14. The chemical compound of claim 6, wherein said support molecule comprises a polymer having a plurality of pendant benzyl groups and said cation is cationic mercury.

15. The chemical compound of claim 14, wherein said polymer comprises a crosslinked, polystyrene divinylbenzene copolymer, wherein the —$SO_2$—S—$R_2$—SH is attached to at least one of said plurality of pendant benzyl groups, wherein said alkyl comprises ethyl, and wherein said cationic mercury is complexed with a mercapto-sulfur of a thio-sulfonyl moiety of said chemical compound and a terminal mercaptan of said chemical compound to form a five member ring-like geometry.

16. The chemical compound of claim 14, wherein said polymer comprises a crosslinked, polystyrene divinylbenzene copolymer, wherein the —$SO_2$—S—$R_2$—SH is attached to at least one of said plurality of pendant benzyl groups, wherein said alkyl comprises propyl, and wherein said cationic mercury is complexed with a mercapto-sulfur of a thio-sulfonyl moiety of said chemical compound and a terminal mercaptan of said chemical compound to form a six member ring-like geometry.

17. A method for removing a cation from a liquid stream, comprising:

contacting a liquid stream comprising a cation with a resin, wherein said resin comprises a chemical compound having the formula $R_1$—$SO_2$—S—$R_2$—SH, wherein $R_1$ comprises a polymer and $R_2$ comprises an alkyl; and     complexing said cation with said chemical compound.

18. The method of claim 17, wherein said polymer comprises a crosslinked, polystyrene divinylbenzene copolymer having a plurality of pendant benzyl groups, wherein the —$SO_2$—S—$R_2$—SH is attached to at least one of said plurality of pendant benzyl groups, wherein said alkyl comprises ethyl or propyl, wherein said cation is cationic lead, and wherein said complexing comprises complexing said cationic lead with a mercapto-sulfur of a thio-sulfonyl moiety of said chemical compound and a terminal mercaptan of said chemical compound to form a ring-like geometry.

19. The method of claim 17, wherein said polymer comprises a crosslinked, polystyrene divinylbenzene copolymer having a plurality of pendant benzyl groups to which the —$SO_2$—S—$R_2$—SH is attached, wherein said alkyl comprises ethyl or propyl, wherein said cation is cationic mercury, and wherein said complexing comprises complexing said cationic mercury with a mercapto-sulfur of a thio-sulfonyl moiety of said chemical compound and a terminal mercaptan of said chemical compound to form a ring-like geometry.

\* \* \* \* \*